(12) United States Patent
Houde-Walter

(10) Patent No.: US 8,322,263 B2
(45) Date of Patent: Dec. 4, 2012

(54) LASER WEAPON SYSTEM AND METHOD

(75) Inventor: William R. Houde-Walter, Rush, NY (US)

(73) Assignee: LaserMax, Inc., Rochester, NY (US)

( * ) Notice: Subject to any disclaimer, the term of this patent is extended or adjusted under 35 U.S.C. 154(b) by 929 days.

(21) Appl. No.: 12/274,754

(22) Filed: Nov. 20, 2008

(65) Prior Publication Data

US 2011/0286488 A1  Nov. 24, 2011

(51) Int. Cl.
*F41F 5/00* (2006.01)
*F42B 5/00* (2006.01)
*H01S 3/0979* (2006.01)

(52) U.S. Cl. ............... 89/1.1; 89/1.14; 102/430; 372/90

(58) Field of Classification Search ............ 89/1.1, 89/1.14; 102/430; 372/55, 58, 77, 90
See application file for complete search history.

(56) References Cited

U.S. PATENT DOCUMENTS

| | | | | |
|---|---|---|---|---|
| 3,646,471 A * | 2/1972 | DeMent | | 372/77 |
| 3,863,176 A * | 1/1975 | Martinez et al. | | 372/89 |
| 4,042,892 A * | 8/1977 | Fenneman | | 372/60 |
| 4,097,820 A * | 6/1978 | Hill et al. | | 372/90 |
| 4,796,834 A * | 1/1989 | Ahlstrom | | 244/3.16 |
| 5,052,011 A * | 9/1991 | Piltch et al. | | 372/77 |
| 5,384,802 A * | 1/1995 | Bushman | | 372/89 |
| 5,421,264 A * | 6/1995 | Petrick | | 102/443 |
| 5,617,444 A | 4/1997 | Houde-Walter | | |
| 5,745,518 A * | 4/1998 | Cuadros | | 372/70 |
| 5,761,235 A | 6/1998 | Houde-Walter | | |
| 6,025,908 A | 2/2000 | Houde-Walter | | |
| 6,128,325 A | 10/2000 | Goldstein et al. | | |
| 6,190,022 B1 | 2/2001 | Tocci et al. | | |
| 6,366,349 B1 | 4/2002 | Houde-Walter | | |
| 6,575,597 B1 | 6/2003 | Cramer et al. | | |
| 6,591,536 B2 | 7/2003 | Houde-Walter et al. | | |
| 6,793,364 B2 | 9/2004 | Cramer et al. | | |
| 7,069,685 B2 | 7/2006 | Houde-Walter | | |
| 2005/0115385 A1 * | 6/2005 | Rodriguez et al. | | 89/1.11 |
| 2006/0272538 A1 * | 12/2006 | Janik et al. | | 102/473 |

OTHER PUBLICATIONS

Rand Corporation: Objective Analysis, Effective Solutions http://www.rand.org/pubs/papers/P5163 (Mar. 30, 2007).
Edinburgh Instruments: CO Grating Tuned Carbon monoxide (CO) Laser from Edinburgh Instruments (http://www.edinst.com/p13.htm (Mar. 30, 2007).
Adamovich et al: Continuous Wave, Electrically Excited, Carbon Monoxide Laser Operating on First Overtone Infrared Bands . . . Jun. 23-26, 2003.
Utkin et al: Compact overtone band carbon monoxide laser, Elsevier Optics Communications (Jan. 10, 2006).
Gas Dynamic Laser http://laserstars.org/history/gasdynamic.html (Mar. 30, 2007).
Laser Construction, Wikipedia http://en.wikipedia.org/wiki/Laser_construction (Mar. 30, 2007).
Stavatti Corporation: Gasdynamic Laser Weapon System.

(Continued)

*Primary Examiner* — Bret Hayes
(74) *Attorney, Agent, or Firm* — Finnegan, Henderson, Farabow, Garrett & Dunner LLP

(57) ABSTRACT

A laser weapon system includes a chamber configured to direct a post-detonation gas flow between a first mirror and a second mirror, and an ejectable ammunition cartridge containing a first gas and a second gas. The cartridge is fluidly connected to the chamber.

43 Claims, 4 Drawing Sheets

OTHER PUBLICATIONS

SpringerLink: CO2 mixing gasdynamic laser with emitting molecules formed in the reacting CO-O2-H2 Mixture: vol. 59, No. 5j Nov. 1990 http://www.springerlink.com/content/.

Wakabayashi et al: Effect of residual CO on combustion-type CO2-gas dynamic laser performance: Japanese Journal of Applied Physics, vol. 18, May 1979, p. 975-979.

* cited by examiner

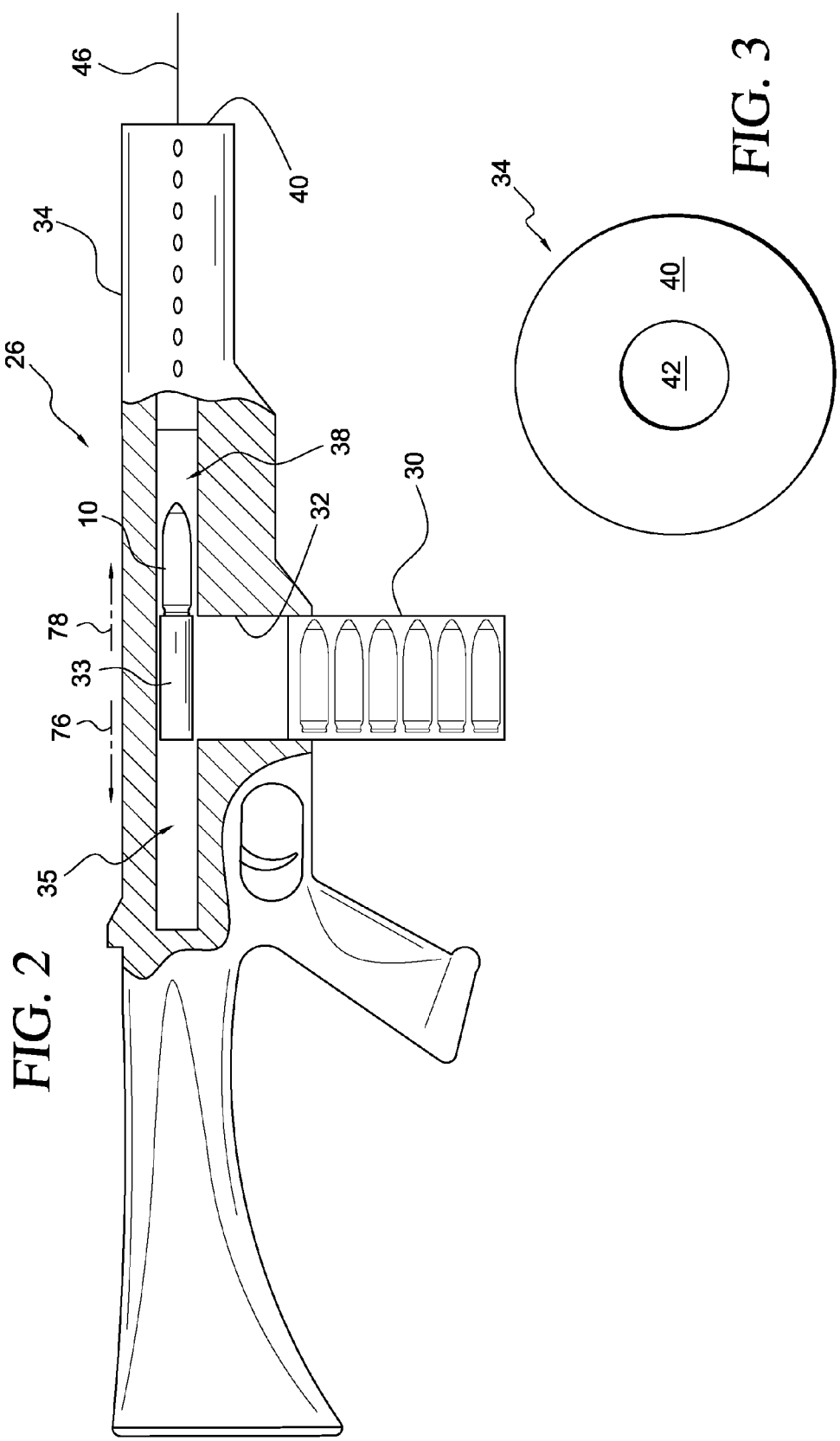

ingly, the housing 12 may be made from any metals, alloys, or
LASER WEAPON SYSTEM AND METHOD

CROSS-REFERENCE TO RELATED APPLICATIONS

N/A

STATEMENT REGARDING FEDERALLY SPONSORED RESEARCH OR DEVELOPMENT

N/A

THE NAMES OF THE PARTIES TO A JOINT RESEARCH AGREEMENT

N/A

INCORPORATION-BY-REFERENCE OF MATERIAL SUBMITTED ON A COMPACT DISC

N/A

BACKGROUND OF THE INVENTION

1. Field of the Invention

The present disclosure generally relates to laser weapons and, in particular, to weapon systems and methods incorporating gas dynamic lasers.

2. Description of Related Art

Gas dynamic lasers have been in existence since the early 1970s. In such lasers, hot gases are directed through appropriately shaped nozzles from a high pressure, high temperature chamber into a low pressure chamber. This transition from high to low pressure creates a non-equilibrium region in the low pressure region and the gases in this low pressure region may emit large amounts of energy. This energy is often released from the gases in the form of both heat and light, and this release of energy can be defined as a stimulated emission from the photons contained within the heated gases.

In most known gas dynamic lasers, gases such as, for example, hydrogen and fluorine can be combined in a combustion chamber via a chemical reaction in which heat and light energy are emitted. Alternatively, in other known gas dynamic lasers, chemicals such as iodine and oxygen can be used. In such known gas dynamic lasers, however, the chemical reaction between the two gases results in the emission of primarily heat energy. Thus, from the standpoint of producing energy in the form of light, such known gas dynamic lasers are highly inefficient.

In still other known lasers, metal oxides are combusted to produce heat and light energy. The reaction of metal oxides in such lasers produces a large amount of soot and other metal vapor byproducts. Thus, the chemically explosive mixture of elements used to create energy in the form of light in such known lasers acts to quickly contaminate the mirrors and/or windows of such lasers through which the emitted light energy is directed. In particular, metals from the explosive mixture can coat the one or more windows and/or mirrors disposed within a laser chamber of such devices after only a single reaction is completed. Thus, such lasers are typically only usable for a single firing, after which the entire chamber and associated windows and/or mirrors must be removed, cleaned, and replaced. Such a process is time-intensive and can be fairly expensive. In addition, the fragile components requiring cleaning can often be damaged and/or misaligned in the removal, cleaning, and reassembly process, further increasing the cost and difficulty of using such known lasers.

The methods and structures disclosed herein are directed towards overcoming one or more of the deficiencies discussed above.

BRIEF SUMMARY OF THE INVENTION

According to an exemplary embodiment of the present disclosure, a laser weapon system includes a chamber configured to direct a post-detonation gas flow between a first mirror and a second mirror. The system also includes an ejectable ammunition cartridge containing a first gas and a second gas. The cartridge is fluidly connected to the chamber.

In another exemplary embodiment of the present disclosure, a method of forming a laser beam with a laser weapon system includes combusting a gas disposed in a removable cartridge to form a post-detonation gas flow exiting the cartridge, directing the post-detonation gas flow through a chamber fluidly connected to the cartridge, the post-detonation gas flow passing between first and second mirrors of the chamber, and cooling a portion of the post-detonation gas flow upstream of the first and second mirrors. In such an exemplary embodiment, cooling the portion of the post-detonation gas flow causes the flow to emit light energy.

In a further exemplary embodiment of the present disclosure, a laser weapon system includes a chamber having a frontmost leg and a separate rearmost leg, the chamber defining a detonation axis and an emission axis substantially parallel to the detonation axis. The system also includes a first mirror disposed on the rearmost leg substantially parallel to a second mirror disposed on the frontmost leg. A reflective surface of each of the first and second mirrors is disclosed substantially perpendicular to the emission axis. The laser weapon system also includes a first venturi disposed upstream of the first mirror, and a second venture disposed upstream of the second mirror.

BRIEF DESCRIPTION OF THE SEVERAL VIEWS OF THE DRAWINGS

FIG. 2 illustrates a laser weapon system according to an exemplary embodiment of the present disclosure.

FIG. 3 is a front view of a portion of the laser weapon system illustrated in FIG. 2.

DETAILED DESCRIPTION OF THE INVENTION

Figure 1:
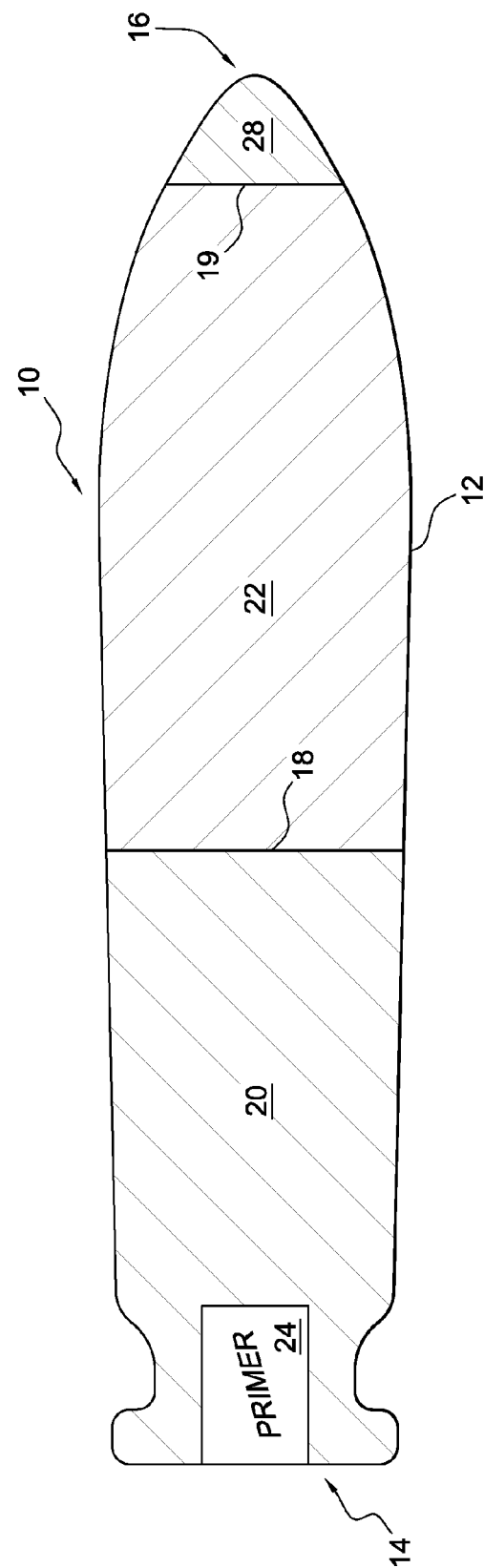
FIG. 1 illustrates a cartridge according to an exemplary embodiment of the present disclosure.

FIG. 1 illustrates an ejectable ammunition cartridge 10 of a laser weapon system 36 (FIGS. 4 and 5) according to an exemplary embodiment of the present disclosure. The exemplary cartridge 10 includes, for example, a housing 12 defining a base 14 and a tip 16. The housing 12 may have any shape, size, and/or other configuration known in the art. In an exemplary embodiment, the housing 12 may be shaped similar to a bullet such as, for example, a nine millimeter bullet or any other size conventional ammunition known in the art. It is understood that the cartridge 10 may be shaped, sized, and/or otherwise configured to be utilized as a bullet with conventional rifles and/or other firearms known in the art. Accordingly, the housing 12 may be made from any metals, alloys, or other materials conventionally used for such firearm ammunition. In an exemplary embodiment, the cartridge 10 may be made from steel or an alloy thereof. It is also understood that a portion of an exemplary housing 12 may be made from steel or an alloy thereof, while another portion of the same housing 12 may be made from a different metal and/or metal alloy.

The tip 16 may be disposed at a front-end of the housing 12. As shown in FIG. 1, the tip 16 may be substantially rounded and, in an exemplary embodiment, the tip 16 may define a point. In an exemplary embodiment, the tip 16 may be crimped, soldered, welded, and/or otherwise closed. In addition, the tip 16 may be sealed using a glue, an epoxy, a resin, and/or any other known sealing material. As shown in FIG. 1, the tip 16 may be disposed at an opposite end of the cartridge 10 from the base 14, and a primer 24 may be disposed at the base 14 of the cartridge 10.

The primer 24 may be any combination of detonation chemicals known in the art. Such materials are commonly used to detonate and/or otherwise ignite combustible chemicals in close proximity thereto, and may include, for example, gun powder and/or other known substances. In an alternative exemplary embodiment, the primer 24 may comprise a component of the cartridge 10 configured to ignite the one or more gases contained therein utilizing an electrical charge. In such an exemplary embodiment, the primer 24 may be configured to produce an electrical spark at one or more gaps or poles defined thereby. In such an exemplary embodiment, the cartridge 10 and/or other components of the laser weapon system 36 discussed herein may include a source of electrical power and a means for transmitting the electrical power between the power source and the primer 24. In additional exemplary embodiments, the primer 24 may comprise cordite nitrocellulose-based smokeless powder mixtures, and/or other known primer materials.

As shown in FIG. 1, the cartridge 10 may include one or more membranes 18, 19. One or more of the membranes 18, 19 of the cartridge 10 may be ruptureable upon ignition and/or combustion of the gases contained within the cartridge 10. In an exemplary embodiment, a membrane 18 may be disposed within the housing 12 of the cartridge 10 so as to separate the housing 12 into a first section 20 and a second section 22. The membranes 18, 19 of the cartridge 10 may comprise the same metals, alloys, and/or other materials utilized to construct the housing 12 of the cartridge 10. In such an exemplary embodiment, it is understood that the membranes 18, 19 may have a thickness that is substantially less than a thickness of a wall of the housing 12 such that the membranes 18, 19 may be relatively easily ruptureable. In such an exemplary embodiment, the membranes 18, 19 may be fixedly attached to the housing 12 so as to form a fluid seal therewith. Accordingly, the membranes 18, 19 may form a substantially fluid-tight barrier between different gases disposed within the cartridge 10. For example, in an embodiment of the present disclosure, the membrane 18 may form a fluid-tight barrier between a first gas disposed in the first section 20 and a second gas disposed in the second section 22. It is also understood that a third section 28 may contain the sealing materials discussed above with respect to the tip 16, and the membrane 19 may form the third section 28 adjacent the second section 22 and proximate the tip 16.

It is also understood that a plurality of ejectable ammunition cartridges 10 may be disposed within, for example, a magazine 30 of a type known in the art. As shown in FIG. 2, such a magazine 30 may be mechanically connected to a firearm 26 in any convenient location known in the art. In an exemplary embodiment, the firearm 26 may be, for example, a rifle, shotgun, and/or any other type of automatic or semi-automatic weapon known in the art. Such firearm 26 may be used, for example, in hunting, combat, law enforcement, self defense, target practice, and/or any other known activities. Accordingly, the cartridges 10, magazines 30, and other methods and/or structures described herein may be configured for use with firearms 26 of the types commonly known in the art. The magazine 30 may be, for example, spring loaded such that the one or more cartridges 10 disposed therein may be automatically loaded into a portion of the firearm 26.

Figure 4:
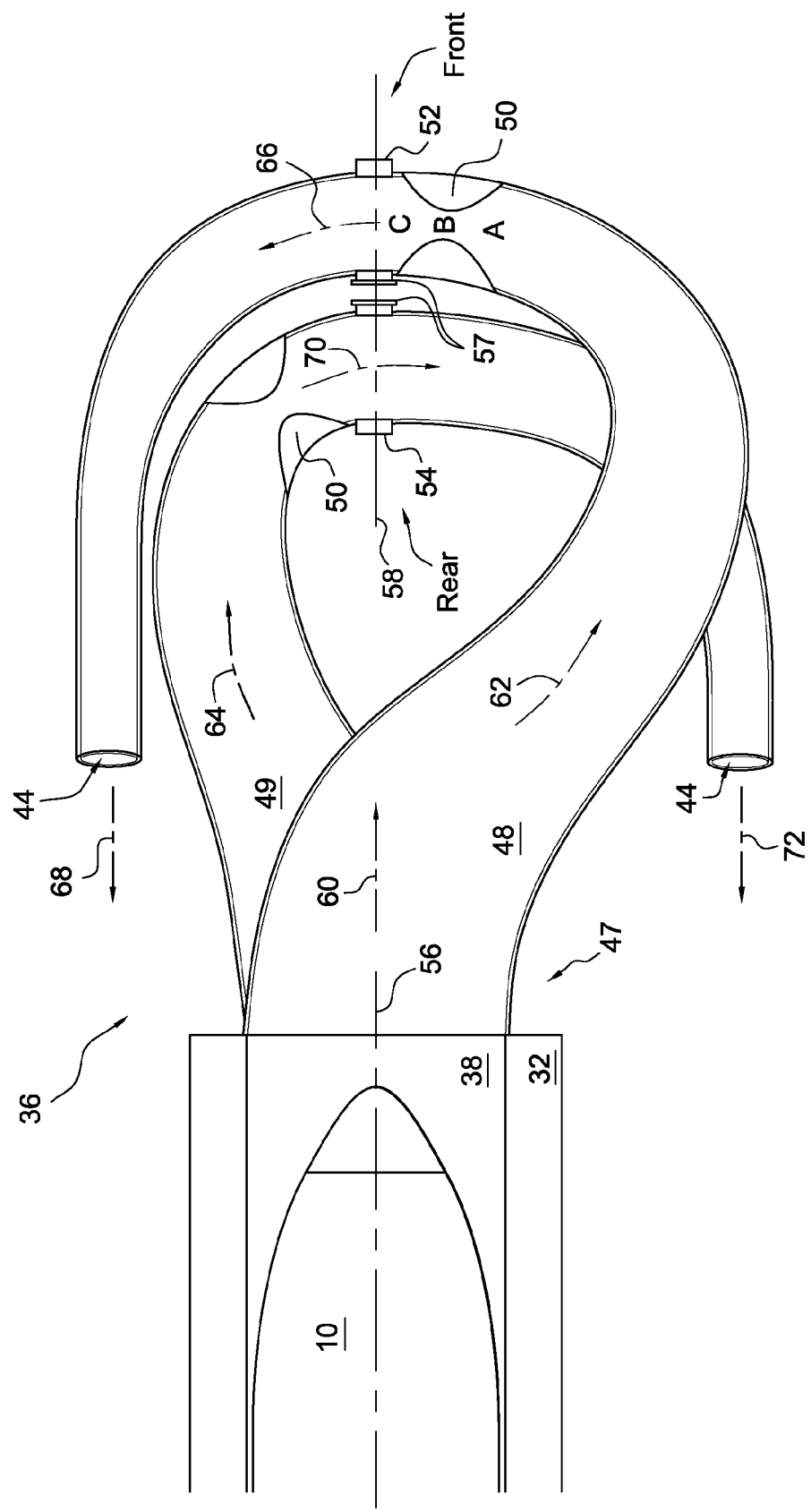
FIG. 4 illustrates a chamber of a laser weapon system according to an exemplary embodiment of the present disclosure.

In an exemplary embodiment, the firearm 26 may include a loader 32 to which the magazine 30 may be connected. The loader 32 may be any component and/or mechanism of the firearm 26 configured to mate with the magazine 30 and to assist in automatically or semi-automatically positioning one or more cartridges 10 within a barrel 34 of the firearm 26 during use. The loader 32 may be in communication with and/or otherwise include, for example, a buffer 35 and a bolt 33 configured to assist in stripping a cartridge 10 from the magazine 30 and positioning the stripped cartridge 10. In an exemplary embodiment, the loader 32 may accept a single cartridge 10 automatically presented by the magazine 30 and may position the cartridge 10 within and/or proximate to the barrel 34 for firing and/or otherwise detonating. In such an exemplary embodiment, the loader 32 may also assist in ejecting and/or otherwise discharging the cartridge 10 after firing. Once the ejected cartridge 10 has been removed from the loader 32, the loader 32 may also be configured to automatically accept a next cartridge 10 from the magazine 30. In this way, the loader 32 may be configured to assist in reloading the firearm 26 for repeated firing of, for example, laser beams 44, 46 (FIG. 4). As such structures and/or firearm components are well-known in the art, a detailed description of the components and structures utilized in the loader 32 will not be described herein.

The loader 32 may be fluidly connected to the barrel 34 and, when a cartridge 10 is positioned within the loader 32, the cartridge 10 may become fluidly connected to the barrel 34 upon rupturing of the sealed tip 16 and/or membrane 19 (FIG. 1). In addition, the detonation of the gases contained within the cartridge 10 may produce a gas pressure within the loader 32 sufficient to, for example, blow back the bolt 33 and/or otherwise cycle the action of the firearm 26. It is understood that cycling the action of firearm 26 may include ejecting the spent cartridge 10 from the loader 32 and/or loading an unspent cartridge 10 into the loader 32 from the magazine 30.

In exemplary embodiments of the present disclosure, the barrel 34 may have a free and/or otherwise open end. Alternatively, as shown in FIG. 3, the barrel 34 may have a face 40 defining one or more orifices. For example, as shown in FIG. 3, the face 40 may define at least one exit eyelet 42. Although both the face 40 of the barrel 34 and the exit eyelet 42 shown in FIG. 3 are circular in shape, it is understood that the barrel 34 and/or the eyelet 42 may have any size, shape, and/or other configuration known in the art. Also, in additional exemplary embodiments, a plurality of eyelets 42 may be disposed substantially horizontally aligned, substantially vertically aligned, aligned in substantially a circular formation, and/or organized in any other desirable pattern about the face 40. In addition, in an exemplary embodiment in which the face 40 defines only a single eyelet 42, the single eyelet 42 may be disposed anywhere on the face 40 so as to assist in desirably aiming and/or otherwise directing one or more laser beams 44, 46 (FIG. 4) discharged by the firearm 26.

As shown in FIG. 4, an exemplary laser weapon system 36 of the present disclosure can include, for example, a cartridge 10 and components of the firearm 26 discussed with respect to at least FIG. 2 such as, for example, the loader 32. As shown in FIG. 4, the loader 32 may define at least one bay 38 configured to accept a single cartridge 10. The bay 38 may be shaped, sized, and/or otherwise configured to accept cartridges 10 of any size, shape, and/or configuration. The laser weapon system 36 may also include at least one chamber 47 fluidly connected to the bay 38 of the loader 32. Accordingly, when a cartridge 10 is disposed within the bay 38, a breach and/or rupture of the housing 12 (FIG. 1) may cause a portion of the cartridge 10 to become fluidly connected to the chamber 47.

In an exemplary embodiment, the chamber 47 may define at least one leg and, as shown in the embodiment of FIG. 4, the chamber 47 may define a plurality of legs 48, 49. The legs 48, 49 of the chamber 47 may have any shape, size, and/or other configurations known in the art and, in an exemplary embodiment, each of the legs 48, 49 may have substantially the same length, volume, shape, and/or other quantifiable characteristic. The legs 48, 49 may be, for example, substantially hollow such that a flow of gas may be permitted to travel therethrough and, in an exemplary embodiment, such a flow of gas may be configured to flow from the cartridge 10 disposed within the bay 38 through the chamber 47 to an exit 44 of the chamber 47. In an exemplary embodiment, each leg 48, 49 of the chamber 47 may accept a flow of gas traveling in the direction of arrow 60 and may direct the gas in any desirable direction such as, for example, in the direction of arrows 62, 64 shown in FIG. 4. It is understood that an equal volume of gases emitted by the cartridge 10 disposed in the bay 38 may travel through each respective leg 48, 49 of the chamber 47 and the flow of gas passing through the chamber 47 may exit the chamber 47 in the direction of arrows 68, 72, respectively.

The chamber 47 may include a first mirror 54 and a second mirror 52, and the first and second mirrors 54, 52 may be positioned downstream of ventures 50 disposed within one or more of the respective legs 48, 49. The first and second mirrors 54, 52 may comprise any type of mirror known in the art and at least one of the mirrors 54, 52 may be substantially fully reflective. In an exemplary embodiment, the first mirror 54 may be disposed on the rearmost leg 49 of the chamber 47 and may be substantially fully reflective while the second mirror 52 may be disposed on the frontmost leg 48 of the chamber 47 and may be partially transmissive. In such an exemplary embodiment, light energy may be directed by the first mirror 54 to the second mirror 52 and a portion of the light energy received by the second mirror 52 from the first mirror 54 may be directed to an exit eyelet 42 (FIG. 3) of the laser weapon system 36 by the second mirror 52. In addition, in such an exemplary embodiment, a remainder of the light energy received by the second mirror 52 may be reflected and/or otherwise directed back to the first mirror 54. Each leg 48, 49 may also include at least one transparent window 57 positioned between the mirrors 54, 52 and in the path of the light energy to permit the additive transmission of such energy between the mirrors 54, 52.

The first and second mirrors 54, 52 may have any shape, size, and/or other configuration known in the art and may be, for example, substantially flat or substantially confocal. In an exemplary embodiment, at least one of the first and second mirrors 54, 52 may be disposed upon and/or otherwise fixedly connected to an outer wall of a leg 48, 49 of the chamber 47. In addition, the first and second mirrors 54, 52 may be positioned with respect to each other such that a flow of gas passing through the legs of the chamber 47 may pass between the mirrors 54, 52 at substantially the same time. In an exemplary embodiment, the chamber 47 may include a total of two mirrors 54, 52 regardless of the total number of legs included in the chamber 47. In such an embodiment, the substantially fully reflective first mirror 54 may be disposed on the rearmost leg and the partially transmissive second mirror 52 may be disposed on the frontmost leg. In addition, any number of substantially transparent windows 57 may be disposed on and/or otherwise connected to the legs intermediate the two mirrors 54, 52. Alternatively, in chamber embodiments including only a single leg (not shown), such windows 57 may be omitted.

In an exemplary embodiment of the present disclosure, the first and second mirrors 54, 52 may be disposed along an emission axis 58 defined by the chamber 47 and, in such an exemplary embodiment, at least one of the mirrors 54, 52 may be disposed substantially perpendicular to the emission axis 58. An adjustment mechanism such as, for example, a threaded screw adjuster or other conventional fine adjustment device, may be connected to each mirror 54, 52 to assist in adjusting its position relative to the other and/or relative to the axis 58. As shown in FIG. 4, the emission axis 58 may be substantially parallel to a detonation axis 56 of the laser weapon system 36. It is understood that in additional exemplary embodiments, the emission axis 58 may lie in the same plane as the detonation axis 56 and, in further exemplary embodiments, the emission axis 58 may be collinear with the detonation axis 56.

As shown in FIG. 4, the detonation axis 56 may be defined by a post-detonation gas flow released from the cartridge 10 disposed within the bay 38. For example, upon detonation of the primer 24 (FIG. 1) disposed within the cartridge 10, gases within the housing 12 of the cartridge may combust and one or more byproducts of the combustion may form a post-detonation gas flow within the chamber 47. In addition, the emission axis 58 may be defined by one or more laser beams 46 (FIG. 2) exiting the eyelets 42 defined by the face 40 of the barrel 34 (FIG. 4). The one or more laser beams 46 emitted by the laser weapon system 36 may be formed from light energy emitted by the post-detonation gas flow proximate the first and second mirrors 54, 52. Accordingly, as discussed above, the post-detonation gas flow may be directed along an axis that is parallel to and/or collinear with an axis of one or more laser beams 46 produced by the laser weapon system 36.

The laser weapon system 36 may further comprise at least one venturi 50 disposed within one or more of the legs 48, 49 of the chamber 47. In an exemplary embodiment, a venturi 50 may be disposed proximate to and/or upstream of the first and second mirrors 54, 52. In such an embodiment, the venturi 50 may also be disposed proximate to and/or upstream of any windows 57 that are positioned optically intermediate of the mirrors 54, 52. The venturi 50 may be any type of flow compression and/or expansion device known in the art. In an exemplary embodiment, a post-detonation gas flow may be directed towards the venturi 50 in the direction of arrow 62 at position A. It is understood that, upstream of the venturi 50, the post-detonation gas flow may have a first temperature and pressure. The post-detonation gas flow may enter the venturi 50 and may proceed to position B wherein the gas flow will be compressed. The gas flow may, thus, have a second pressure and a second temperature at position B, and the second pressure and second temperature at position B may be greater than the first pressure and first temperature at position A. Upon exiting the venturi 50 at position C, however, the post-detonation gas flow may have a third pressure and a third temperature, and the third pressure and third temperature at position C may be substantially lower than the first pressure and first temperature of the gas flow at position A.

Although the post-detonation gas flow may be cooled as a result of passing through the venturi 50, the gas flow at position C may still have a substantially elevated energy level due to detonation. It is understood that passing such a cooled, high energy gas flow through a chamber, such as the chamber 47, may cause the post-detonation gas flow to spontaneously emit energy in the form of both heat and light. The chamber 47, and other components of the laser weapon system 36, may be configured to maximize the amount of light energy produced by the post-detonation gas flow and to substantially reduce the amount of heat energy emitted by the post-detonation gas flow upon passing through the venturi 50. In particular, due to the configuration of the chamber 47 and the gases used to produce the post-detonation gas flow, the laser weapon system 36 of the present disclosure may be configured to produce a laser having a wavelength of, approximately, ten microns. In addition, the combustion reaction between the gases contained within the cartridge 10 may be between, approximately, 30% to 50% efficient. Such a reaction may produce a laser beam having, approximately, 5,000 Joules of energy or more.

Moreover, unlike known gas dynamic lasers, the exemplary post-detonation gas flow of the current disclosure is, itself, used as the lasing media. Thus, the laser weapon system 36 of the present disclosure does not suffer from the soot contamination issues that plague similar prior art lasers. Also, the detonation of the gases contained in the cartridge 10 may produce a gas pressure within the loader 32 sufficient to cycle the action of the firearm 26. As shown in FIG. 4, once the post-detonation gas flow passes through the venturi 50 and between the first and second mirrors 54, 52, the flow may exit the leg 48 in the direction of arrow 68, and may exit the leg 49 in the direction of arrow 72.

Figure 5:
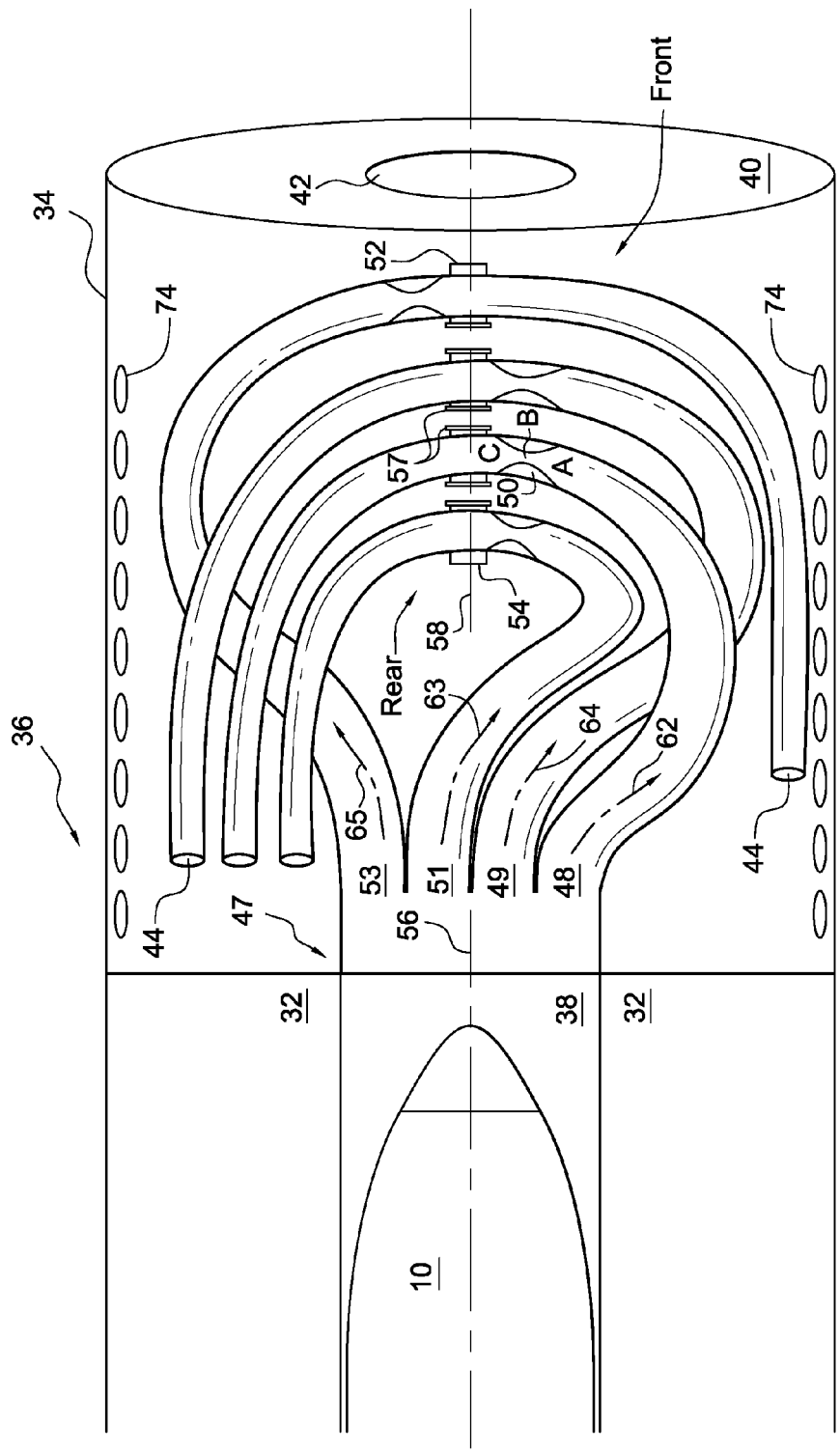
FIG. 5 illustrates a chamber of a laser weapon system according to another exemplary embodiment of the present disclosure.

As discussed above, the laser weapon system 36 may include a chamber 47 having a plurality of legs and each of the legs may receive a substantially equal volume of a post-detonation gas flow upon combustion of the gases carried by the cartridge 10. In order to facilitate a substantially equal distribution of the post-detonation gas flow among the legs of the chamber 47, each leg may have, for example, substantially the same length, substantially the same volume, and/or any other physical configuration known to produce a substantially equivalent distribution of liquids and/or gases among a plurality of fluidly connected flow paths. In an exemplary embodiment, a distance between an entrance of the chamber 47 and an entrance of the venturi 50 disposed within each leg of the chamber 47 may be substantially equal to assist in facilitating the substantially equal distribution of post-detonation gas flow. For example, FIG. 5 illustrates an additional exemplary embodiment of the present disclosure in which the chamber 47 comprises four legs 48, 49, 51, 53. FIG. 5 is an exemplary top view of a chamber 47 that may be employed to produce the laser beam 46 illustrated in the side view of FIG. 2. Similarly, it is understood that FIG. 4 discussed above may also be a top view of an exemplary chamber 47 of the present disclosure.

An exemplary barrel 34 of the present disclosure is shown in FIG. 5 to assist in understanding the configuration of the chamber 47 with respect to other components of the laser weapon system 36. As shown in FIG. 5, the emission axis 58 may be substantially parallel to and/or collinear with the detonation axis 56, and the first and second mirrors 54, 52 may be disposed substantially perpendicular to the emission axis 58. In addition, a substantially equal portion of a post-detonation gas flow produced by a reaction between the chemicals contained within the cartridge 10 may pass to each leg 48, 49, 51, 53 of the chamber 47, as shown by the arrows 62, 64, 63, 65, respectively. Each leg 48, 49, 51, 53 may be of substantially the same length, shape, and/or other configuration to facilitate such a substantially equal distribution of the post-detonation gas flow. In addition, it is understood that once the post-detonation gas flow exits the legs 48, 49, 51, 53 of the chamber 47, the flow may exit the barrel 34 via a plurality of orifices 74 defined by a wall of the barrel 34. In addition to allowing the post-detonation gas flow to escape the barrel 34, the orifices 74 may assist in reducing the noise produced by the laser weapon system 36 upon firing. It is understood that the barrel 34 may also include additional structures and/or components to assist in substantially silencing the laser weapon system 36 during use.

As discussed above, the exemplary laser weapon systems 36 disclosed herein can be used in conjunction with any conventional firearm 26 (FIG. 2) known in the art. Thus, in an exemplary embodiment, a firearm 26 can be modified to house, for example, a chamber 47 configured to produce a laser beam 46 of the present disclosure. Alternatively, an exemplary laser weapon system 36 of the present disclosure may comprise a firearm 26 specifically designed to produce a laser beam 46, and such a firearm 26 may not require such modifications. The laser weapon systems 36 of the present disclosure may be utilized to direct a laser beam 36 in the direction of a target in any application where the direction of such a laser beam may be desired. Such applications may include, but are not limited to, activities engaged in on a field of battle. Accordingly, such applications for the laser weapon systems 36 of the present disclosure may be law enforcement and/or military in nature.

As discussed above, forming a laser beam 46 with a laser weapon system 36 of the present disclosure may include combusting a first gas and a second gas in a sealed cartridge 10 to form a post-detonation gas flow exiting the cartridge 10. The post-detonation gas flow may be directed through the chamber 47 fluidly connected to the cartridge 10. A portion of the post-detonation gas flow may be cooled within the chamber 47 upstream of a first and second mirror 54, 52 disposed within the chamber 47. Cooling the post-detonation gas flow in this way may trap atoms of the gas flow in an excited state proximate the mirrors 54, 52. The excited atoms may spontaneously emit energy in the form of both heat and light proximate the mirrors 54, 52. The mirrors 54, 52 may be positioned, shaped, and/or otherwise configured to additively form a stimulated emission (laser beam 46) from this spontaneous release of energy.

In an exemplary embodiment, the cartridge 10 may be filled with, for example, nitrous oxide, carbon monoxide, and/or any other known gaseous oxide. The cartridge 10 may also be filled with a gas configured to combust with such an oxide at elevated heats and pressures. In an exemplary embodiment, the first section 20 may be filled with nitrous oxide and the second section 22 may be filled with carbon monoxide. In such an exemplary embodiment, the membrane 18 may separate the two gases prior to combustion. It is understood, however, that in an additional exemplary embodiment, the membrane 18 may be omitted and the two gases may be substantially homogenously mixed within the housing 12 of the cartridge 10 prior to combustion.

In an embodiment in which the membrane 18 separates the first gas from the second gas, the primer 24 may be ignited and/or activated by any conventional means. Once the primer 24 has been ignited, the ignition may cause the nitrous oxide disposed within the first section 20 to ignite. Such an ignition may be an exothermic reaction and may cause the membrane 18 to rupture. Upon rupturing, the nitrous oxide from the first section may react with the carbon monoxide disposed within the second section 22. Such a reaction between the two gases may cause a portion of the cartridge 10 to be breached. For example, upon reacting the ignited nitrous oxide with the carbon monoxide disposed within the second section 22, the membrane 19 disposed proximate the tip 16 of the cartridge 10 may rupture thereby forming a fluid connection between, for example, a portion of the chamber 47 and the cartridge 10. In particular, the nitrous oxide disposed within the first section 20 may react with the carbon monoxide disposed in section 22 in a combustion reaction to form a post-detonation gas flow exiting a breached portion of the cartridge 10 substantially along the detonation axis illustrated in FIG. 4. In addition, the reactions and/or gaseous releases discussed above may create sufficient gas pressures within, for example, the loader 32 to blow the bolt 33 back in the direction of arrow 76 (FIG. 2). Through its interaction with the buffer 35, the bolt 33 may be urged in the direction of arrow 78 and may return to its original position. Cycling the bolt 33 in this way may cause the spent cartridge 10 to be ejected and may cause an unspent cartridge 10 to be loaded. For ease of description, the exemplary embodiment of the present disclosure illustrated in FIG. 4 will be described for the duration of this disclosure unless otherwise specified.

Upon being breached and/or otherwise ruptured, a portion of the cartridge 10 may become fluidly connected to a portion of the chamber 47. The post-detonation gas flow may enter the chamber 47 substantially along the detonation axis 56 in the direction of arrow 60. Upon entering the chamber 47, a substantially equal portion of the post-detonation gas flow may be directed to each leg 48, 49 of the chamber 47, respectively. This substantially equivalent portion of the post-detonation gas flow is illustrated by the direction arrows 62, 64. As shown with respect to the leg 48, the portion of the post-detonation gas flow may be directed to the venturi 50 having a first temperature and a first pressure substantially upstream of the venturi 50 at position A. Upon entering the venturi 50, the pressure and temperature of the post-detonation gas flow may be increased at position B. The venturi 50 may, however, be designed and/or otherwise configured to reduce the temperature and/or pressure of the gas flow passing therethrough and, accordingly, at position C, the temperature and/or pressure of the post-detonation gas flow may be reduced with respect to the first temperature and/or first pressure of the flow at position A. In particular, the temperature of the post-detonation gas flow at position C may be less than the temperature of the post-detonation gas flow at position A, and the reduced temperature gas flow may pass between the second mirror 52 and the window 57 of leg 48 in the direction of arrow 66. This same process may also occur within leg 49 at substantially the same time. Thus, a reduced temperature gas flow may pass between the first mirror 54 and the window 57 of leg 49, in the direction of arrow 70, at substantially the same time as the reduced temperature flow passes between the second mirror 52 and window 57 of leg 48.

Upon passing between the first and second mirrors 54, 52, the cooled post-detonation gas flow in each leg 48, 49 may spontaneously emit, for example, light energy in a direction substantially parallel to the emission axis 58. The first mirror 54 may be substantially fully reflective and may direct substantially all of the light energy incident upon it to the second mirror 52. The light energy may pass between the legs 48, 49 of the chamber 47 through windows 57. The second mirror 52 may be partially transmissive, and the second mirror 52 may, thus, direct a portion of the light energy received from the first mirror 54 to an exit eyelet 42 in the form of a single, additively-formed, gaussian laser beam 46 (FIG. 2). Although not illustrated in FIG. 4, it is understood that the one or more laser beams 46 emitted by the chamber 47 may be directed along the emission axis 58. In an exemplary embodiment, the laser beam 46 produced by the laser weapon system 36 may be collinear with the detonation axis 56.

Because the post-detonation gas flow does not include hydrocarbons in the form of, for example, soot, soluble organic fraction, and/or other carbon derivatives, the light energy emitted by the lasing of the post-detonation gas flow between the first and second mirrors 54, 52 produces substantially no hydrocarbon buildup on components of the chamber 47 such as, for example, the first and second mirrors 54, 52. As a result, the chamber 47 of the present disclosure can be reused repeatedly without cleaning or other maintenance required for by prior art laser devices. In particular, the post-detonation gas flow may be primarily comprised of carbon dioxide at an elevated temperature. Such a hot flow of carbon dioxide will act as a lasing media upon being cooled in a laser chamber such as, for example, the chamber 47 described above. As discussed above, the lasing of carbon dioxide gas upon a reduction in temperature produces substantially no hydrocarbons while emitting upwards of 5,000 Joules of energy in the form of heat and/or light.

Once the post-detonation gas flow has passed between the first and second mirrors 54, 52, the flow may exit the legs 48, 49 of the chamber 47 in the direction of arrows 68, 72, and may exit the barrel 34 through the one or more orifices 74 (FIG. 5) defined thereby. Due to the configuration of the barrel 34 and the one or more components thereof, the firing of the laser weapon system 36 may be substantially silent.

As discussed above, once the post-detonation gas flow has exited the cartridge 10, the breached cartridge 10 may be ejected from the loader 32. This ejection may cause another cartridge 10 to be automatically loaded into the bay 38 of the loader 32 from the magazine 30 connected to the loader 32. Automatically reloading the firearm 26 in this way may assist in substantially automatically and/or substantially semi-automatically firing the firearm 26 during use. Such automatic and/or semi-automatic firing may enable the firearm 26 to be utilized in military, law enforcement, and/or other known combat environments. In addition, because the post-detonation gas flow emitted by the cartridges 10 does not leave a buildup of soot, and/or other hydrocarbon derivatives within any of the components of the chamber 47, the chamber 47 of the laser weapon system 36 may be reusable without substantially any degradation in the intensity, accuracy, repeatability, and/or other quantifiable characteristics of the laser beam 46 emitted by the laser weapon system 36.

Other embodiments will be apparent to those skilled in the art from consideration of this specification. For example, the chamber may further include at least one lens optically downstream of the frontmost leg configured to collimate, adjust, direct, focus, and/or otherwise modify the laser beam. It is intended that the specification and examples be considered as exemplary only, with the true scope of the invention being indicated by the following claims.

The invention claimed is:

1. A laser weapon system, comprising:
a chamber configured to direct a post-detonation gas flow between a first mirror and a second mirror; and
an ejectable ammunition cartridge containing a first gas, a second gas, and a rupturable membrane separating the first gas from the second gas, the cartridge being fluidly connected to the chamber,
wherein the rupturable membrane is disposed proximate a front tip of the cartridge, and the front tip is disposed at an opposite end of the cartridge from a primer of the cartridge.

2. The system of claim 1, wherein the first and second gases form a gas mixture within the cartridge.

3. The system of claim 1, wherein the first mirror is fully reflective and the second mirror is partially transmissive.

4. The system of claim 1, wherein the first and second mirrors are configured to direct an additively-formed laser beam to an exit of the system.

5. The system of claim 4, wherein the laser beam is directed through at least one substantially transparent window and along an emission axis that is substantially parallel to a detonation axis.

6. The system of claim 1, wherein the first mirror directs light energy emitted by the post-detonation gas flow to the second mirror.

7. The system of claim 6, wherein the second mirror directs a portion of the light energy to an exit of the system and directs a remainder of the light energy to the first mirror.

8. The system of claim 1, wherein the first and second mirrors are disposed downstream of a venturi configured to produce a temperature drop in the post-detonation gas flow.

9. The system of claim 1, further including a loader, the cartridge being configured to blow back a component of the loader upon detonation of the first and second gases.

10. The system of claim 1, wherein the chamber defines a detonation axis and an emission axis substantially collinear the detonation axis.

11. The system of claim 1, wherein the first mirror is disposed on a rearmost leg of the chamber and the second mirror is disposed opposite the first mirror on a separate frontmost leg of the chamber.

12. The system of claim 11, wherein the chamber further comprises a first venturi disposed upstream of the first mirror and a second venturi disposed upstream of the second mirror, the first and second venturis configured to produce a temperature drop in the post-detonation gas flow proximate the first and second mirrors, respectively.

13. The system of claim 11, wherein the chamber further comprises a first window disposed on the rearmost leg opposite the first mirror and a second window disposed on the frontmost leg opposite the second mirror.

14. The system of claim 1, wherein the chamber comprises a plurality of legs, a substantially equal portion of the post-detonation gas flow being directed to each leg.

15. A method of forming a laser beam with a laser weapon system, comprising
combusting a gas disposed in a removable cartridge to form a post-detonation gas flow exiting the cartridge;
directing the post-detonation gas flow through a chamber fluidly connected to the cartridge, the post-detonation gas flow passing between first and second mirrors of the chamber; and
cooling a portion of the post-detonation gas flow upstream of the first and second mirrors, wherein cooling the portion of the post-detonation gas flow includes
passing the portion through a first venturi disposed upstream of the first mirror and passing a remainder of the post-detonation gas flow through a second venturi disposed upstream of the second mirror.

16. The method of claim 15, further including directing light energy emitted by the cooled post-detonation gas flow to the second mirror with the first mirror.

17. The method of claim 16, further including directing a portion of the light energy received by the second mirror to an exit of the system with the second mirror and directing a remainder of the light energy received by the second mirror to the first mirror.

18. The method of claim 15, further comprising directing a substantially equal portion of the post-detonation gas flow to each leg of a plurality of legs defined by the chamber.

19. The method of claim 18, wherein each leg comprises a respective venturi and at least one substantially transparent window disposed downstream of the respective venturi.

20. The method of claim 18, wherein the first mirror is disposed on a rearmost leg of the plurality of legs and the second mirror is disposed opposite the first mirror on a frontmost let of the plurality of legs.

21. The method of claim 15, wherein the laser beam is additively formed.

22. The method of claim 15, further including directing the laser beam along an emission axis defined by the system, wherein the chamber defines a detonation axis substantially parallel to the emission axis.

23. The method of claim 15, further comprising inserting a magazine carrying the cartridge into a loader of the system, the loader being fluidly connected to the chamber.

24. The method of claim 23, wherein the loader is connected to a firearm and configured to automatically position a plurality of cartridges upstream of the chamber.

25. The method of claim 23, wherein combusting the gas disposed in the cartridge assists in blowing back a component of the leader.

26. A laser weapon system, comprising:
a chamber having a frontmost leg and a separate rearmost leg, the chamber defining a detonation axis and an emission axis substantially parallel to the detonation axis;
a first mirror disposed on the rearmost leg substantially parallel to a second mirror disposed on the frontmost leg, a reflective surface of each of the first and second mirrors being disposed substantially perpendicular to the emission axis;
a first venturi disposed upstream of the first mirror; and
a second venturi disposed upstream of the second mirror.

27. The system of claim 26, further comprising a plurality of cartridges disposed in a magazine connected to the system, a cartridge of the plurality of cartridges being fluidly connected to the chamber.

28. The system of claim 27, wherein the cartridge comprises a first gas, a second gas, and a rupturable membrane separating the first gas from the second gas.

29. The system of claim 27, wherein the cartridge contains a combustible gas and directs a post-detonation gas flow into the chamber in response to detonation of a primer.

30. The system of claim 29, wherein the chamber directs a portion of the post-detonation gas flow through the first venturi and a remainder of the post-detonation gas flow through the second venturi.

31. The system of claim 29, wherein the post-detonation gas flow spontaneously emits light energy proximate the first and second mirrors.

32. The system of claim 31, wherein the first mirror directs the light energy to the second mirror and the second mirror reflects a portion of the light energy received from the first mirror back to the first mirror.

33. The system of claim 32, wherein the second mirror directs a remainder of the light energy received from the first mirror to an exit of the system.

34. The system of claim 29, wherein an equal portion of the post-detonation gas flow is directed to the frontmost leg and the rearmost leg.

35. The system of claim 26, wherein the chamber comprises a first window disposed opposite the first mirror and a second window disposed opposite the second mirror.

36. A laser weapon system, comprising:
a loader including a bay and a bolt aligned with the bay, the bay configured to accept an ejectable ammunition cartridge containing a first gas separate from a second gas, and the bolt configured to assist in positioning the cartridge within the bay; and a chamber fluidly connected to the bay, the chamber including a leg, a first mirror, a second mirror, and a venturi, wherein the venturi is disposed within the leg, at least one of the first and second mirrors is disposed on the leg downstream of the venturi, and the leg is configured to direct a post-detonation gas flow through the venturi, and between the first and second mirrors.

37. The system of claim 36, further including a buffer coaxial with the bolt and the bay, the buffer configured to accept the bolt when an unspent ammunition cartridge is loaded into the loader.

38. The system of claim 36, further including a barrel fluidly connected to the loader, the barrel substantially surrounding the leg.

39. The system of claim 36, further including a transparent window disposed between the first and second mirrors.

40. The system of claim 36, wherein the first and second mirrors are disposed along an emission axis defined by the chamber.

41. The system of claim 40, wherein the first and second mirrors are disposed substantially perpendicular to the emission axis.

42. The system of claim 36, wherein the first and second mirrors are disposed downstream of the venturi, and the venturi is configured to produce a temperature drop in the post-detonation gas flow.

43. The system of claim 36, wherein the first mirror is disposed on a rearmost leg of the chamber and the second mirror is disposed opposite the first mirror on a separate frontmost leg of the chamber.

* * * * *